B. MACPHERSON.
REHEALING PROCESS FOR CONDENSERS.
APPLICATION FILED NOV. 19, 1919.
1,337,245.
Patented Apr. 20, 1920.
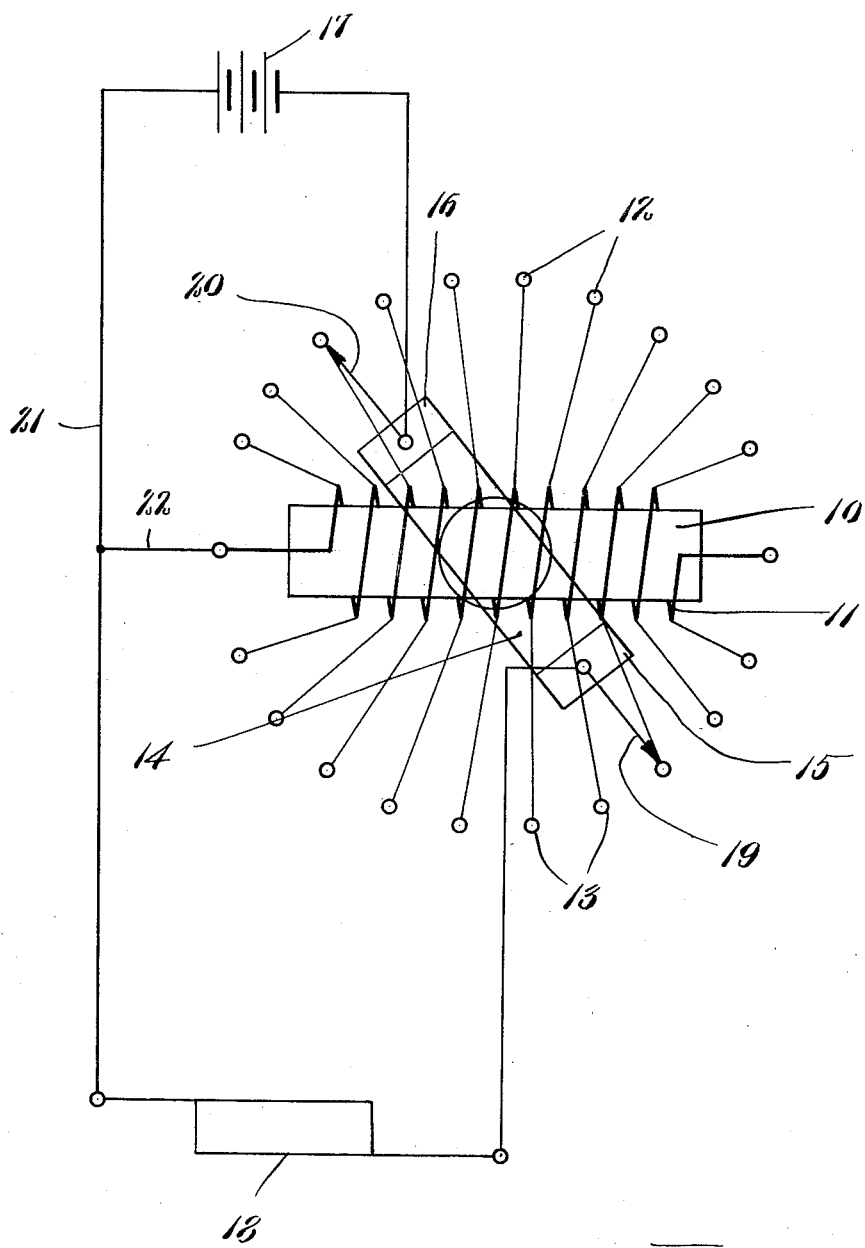
Inventor:
Byron Macpherson
by James R. Hodder
Att'y.

UNITED STATES PATENT OFFICE.

BYRON MACPHERSON, OF ROXBURY, MASSACHUSETTS, ASSIGNOR, BY MESNE ASSIGNMENTS, TO MICA CONDENSER COMPANY, LTD., OF BOSTON, MASSACHUSETTS, A CORPORATION OF MASSACHUSETTS.

REHEALING PROCESS FOR CONDENSERS.

1,337,245.   Specification of Letters Patent.   Patented Apr. 20, 1920.

Application filed November 19, 1919. Serial No. 339,243.

*To all whom it may concern:*

Be it known that I, BYRON MACPHERSON, a citizen of the United States, and resident of Roxbury, in the county of Suffolk and State of Massachusetts, have invented an Improvement in Rehealing Processes for Condensers, of which the following description, in connection with the accompanying drawings, is a specification, like letters on the drawings representing like parts.

My present invention relates to electrical condensers, and more particularly to an improved rehealing process.

In the manufacture of condensers, it is necessary that the condensers be tested, and these tests are made with an electrical potential or pressure that is often several times the pressure under which the condenser should be subjected to in practice. The object of such tests is to discover any weakness that may exist in the condenser, to the end that only a perfect product will be marketed. The effect of such tests, particularly where mica is employed as a dielectric, is to puncture the mica and create a short circuit between two adjacent sheets of foil. Usually the puncture is a very small hole, and may be caused by a testing operation, or what is more likely, was present in the mica sheet at the time of assembly. In my copending application, Ser. No. 339,242, filed Nov. 19, 1919, I have described and claimed an improved apparatus for varnishing the mica sheets, one of the objects being to eliminate, to as great an extent as possible, the minute perforations by filling or sealing them with varnish. Any perforation that may have escaped closure during the varnishing operation, or that was not detected by the source of low potential current in connection with my improved building stand, described and claimed in my copending application, Ser. No. 339,244, filed Nov. 19, 1919, will be detected during the testing operation. Again, the weakness may not be a hole in the mica sheet but is due to a corner of the mica being broken off, or it may be due to a fault in the alternate assembling of the mica and foil in which the assembler may allow the foil to extend beyond the edge of the mica in such a way as to bring the two foils of opposite polarity into contact and thereby cause what is commonly called a shorted condenser. As it is only necessary that one pair of foil sheets short circuit to prevent the condenser functioning, and as it has not been feasible in the past to repair such defect, it will be apparent that a large amount of material in the shape of condemned condensers is wasted, without taking into account the financial loss due to wasted time and labor.

An examination of the average shorted condenser will usually show that where the puncture occurred, the mica being very thin, has allowed the two foils of opposite polarity to become fused together, or else that the foil has been pushed through the hole in the mica so as to allow these foils of opposite polarity to come into engagement, thus causing the shorted condenser. As the hole is usually very small, the actual amount of foil in contact is likewise very small, and I have discovered that the application of sufficient electric current from a source of either direct or alternating supply will burn this small amount of foil away and reheal or repair the condenser. On the passage of current an arc is formed at the point of contact of the two engaging foils, and I have discovered also that the arc, while necessary to cause such burning away, is not really the greatest element in the healing process, but that the greatest effect is produced by the heated mica in proximity to the hole, the heating of the mica, of course, being due to the arc. In connection with this latter point, I have found that if the testing circuit is made properly, or intermittently made and broken to form and destroy the arc, that enough current is passed to heat the mica quite hot without burning it. This heat is sufficient to melt the foil about the hole in the mica for a sufficient distance therefrom to prevent a recurrence of the short circuit at such hole. The current supply must be of low voltage to prevent the formation of an arc of sufficient size to generate heat enough to burn the hole in the mica to such a size as to leave the condenser in almost as bad a condition as when shorted. The condenser being rehealed with low voltage current, may not safely be used on a circuit or across the terminals of a higher potential circuit and for this reason I gradually increase the voltage and decrease the current to the extent that where an arc is formed the potential across the condenser terminals drops to a very small value and I also connect a switch or key in series with the condenser so that in the case where an arc is formed a circuit may be quickly broken.

If even for a very short time a current flows at the increased potential, enough heat may be generated to get the mica about the hole quite hot, and as the foil used is of comparatively low melting point, the heat retained by the mica and foil about the hole is sufficient to cause the foil to continue to melt and draw away from the hole even after the current flow is stopped. It will be evident that as the foil continues to melt away from the hole the insulation resistance of this spot is increased and the condenser rehealed so as to be safe for use with any potential for which it was originally designed.

I have found that by using an initial voltage of 5, and gradually increasing the voltage to say about 2000, that satisfactory results are obtained.

The object of the invention therefore, is an improved method and apparatus for rehealing defective condensers.

In the accompanying drawings, illustrating the preferred embodiment of the apparatus for carrying out my improved method, I employ an auto-transformer, though any other suitable analogous instrument may be employed, such transformer including a core 10 on which is wound the coil 11, taps 12 being taken off one side of the coil and taps 13 off the other side. A rotatable switch arm 14 of insulating material has embedded therein at either end, the conducting plates 15 and 16, means being associated with said plates, as 19 and 20 respectively for engaging with the taps 13 and 12 respectively.

A source of power illustrated conventionally at 17 is connected, one pole by conductors 21 and 22, to one end of the coil 11, while the other pole is connected to the conducting plate 16, as shown. The conductor 21 is also connected to one terminal of the condenser 18 to be rehealed, the other terminal of the condenser being connected to the conducting plate 15, as shown.

The element 14 being rotatable to move the plates 15 and 16 over the taps 13 and 12 respectively, is in nature a rotatable key and provides the means for rapidly making and breaking the circuit through the condenser. If it is assumed that 18 is the condenser that is short circuited and that it is desired to reheal said condenser at the shorted point, said condenser is connected to the auto-transformer in the manner illustrated and the rotatable arm or key moved from an initial position parallel to the core 10, so as to bring the conducting plate 16 into engagement with the lower right one of the taps 12 and the conducting plate 15 into engagement with the upper left one of the taps 13, this engagement being a momentary one. As a result of this movement of the key 14, a circuit is closed and a surge of current passes through the condenser, causing a fusing of the foil at the defective point. As this engagement of the plates 16 and 15 with the taps 12 and 13 respectively is but a momentary one, the arc is quickly destroyed, but the mica about such defective spot, assuming it to be a hole in the mica, is heated sufficiently to cause a continued burning of the foil. The key 14 is rotated in an anti-clockwise direction alternately making and breaking the circuit through the condenser and simultaneously increasing the voltage and decreasing the amount of current in such circuit. By continuing this process until the conducting plate 16 has moved over the lower right tap 12 and the conducting plate 15 has passed over the upper left tap 13, the condenser will have been completely rehealed and will be suitable for use in any circuit for which it was originally designed.

While I have shown the preferred embodiment of my apparatus for carrying out my improved rehealing process, it is to be understood that such showing is for convenience only, and I may vary the details of the construction and arrangement of parts within wide limits without departing from the spirit of my invention.

My invention is further described and defined in the form of claims as follows:

1. The improved process of rehealing short circuited condensers which consists in intermittently including said condenser in a circuit to fuse a foil and heat the dielectric at the defective spot, and gradually increasing the voltage and correspondingly decreasing the amount of current in said circuit.

2. The improved process of rehealing short circuited condensers which consists in including said condenser in a circuit, and varying the voltage in said circuit to intermittently fuse the foil at the defective point.

3. The improved process of rehealing short circuited condensers, which consists in including said condensers in a circuit, and intermittently connecting a source of variable voltage and current in said circuit, while gradually increasing the voltage and simultaneously decreasing the current.

In testimony whereof, I have signed my name to this specification, in the presence of two subscribing witnesses.

BYRON MACPHERSON.

Witnesses:
 AUBREY R. GOODWIN,
 JAMES R. HODDER.